United States Patent
Herle et al.

(10) Patent No.: US 7,092,734 B2
(45) Date of Patent: Aug. 15, 2006

(54) IOTA SOFTWARE DOWNLOAD VIA AUXILIARY DEVICE

(75) Inventors: Sudhindra Pundleeka Herle, Plano, TX (US); Bryan Jeffery Moles, Dallas, TX (US)

(73) Assignee: Samsung Electronics Co., Ltd., Suwon (KR)

( * ) Notice: Subject to any disclaimer, the term of this patent is extended or adjusted under 35 U.S.C. 154(b) by 340 days.

(21) Appl. No.: 10/017,050

(22) Filed: Dec. 13, 2001

(65) Prior Publication Data

US 2003/0027563 A1 Feb. 6, 2003

Related U.S. Application Data

(60) Provisional application No. 60/310,511, filed on Aug. 6, 2001.

(51) Int. Cl.
 *H04M 1/00* (2006.01)
(52) U.S. Cl. .................... 455/556.1; 455/419; 455/420
(58) Field of Classification Search ............ 455/556.1, 455/556.2, 557, 419, 420, 412.1, 418; 709/219, 709/229; 707/10
See application file for complete search history.

(56) References Cited

U.S. PATENT DOCUMENTS

| 5,414,751 | A | 5/1995 | Yamada | 379/58 |
|---|---|---|---|---|
| 5,507,009 | A | 4/1996 | Grube et al. | 455/54.1 |
| 5,689,825 | A | 11/1997 | Averbuch et al. | 455/89 |
| 5,854,978 | A | 12/1998 | Heidari | 455/418 |
| 5,896,566 | A | 4/1999 | Averbuch et al. | 455/419 |
| 6,088,730 | A * | 7/2000 | Kato et al. | 455/556.2 |
| 6,198,946 | B1 | 3/2001 | Shin et al. | 455/561 |
| 6,243,596 | B1 * | 6/2001 | Kikinis | 455/572 |
| 6,408,128 | B1 * | 6/2002 | Abecassis | 386/68 |
| 6,442,570 | B1 * | 8/2002 | Wu | 707/201 |
| 2001/0039212 | A1 * | 11/2001 | Sawano et al. | 463/43 |
| 2002/0174431 | A1 * | 11/2002 | Bowman et al. | 455/154.1 |

\* cited by examiner

*Primary Examiner*—Joseph Feild
*Assistant Examiner*—Huy D. Nguyen

(57) ABSTRACT

Wireless software downloads for resource-constrained wireless devices capable of Internet access are performed by connecting the wireless device to an auxiliary device and downloading the software through the wireless device to storage within the auxiliary device. Once downloaded, the software is installed on the wireless device from the auxiliary device. Use of the wireless device as a download conduit allows security and other features integrated into the wireless device to be directly employed during the download and installation.

20 Claims, 2 Drawing Sheets

IOTA SOFTWARE DOWNLOAD VIA AUXILIARY DEVICE

The present invention claims priority to U.S. Provisional Application Ser. No. 60/310,511 filed Aug. 6, 2001.

TECHNICAL FIELD OF THE INVENTION

The present invention is directed, in general, to software downloads to wireless communications devices and, more specifically, to wireless software downloads to wireless devices capable of accessing the Internet.

BACKGROUND OF THE INVENTION

As wireless communication devices such as mobile telephones and personal digital assistants (PDAs) become increasingly prevalent, the need for software downloads to such devices (e.g., to upgrade operating system software, update applications, or add after-market functionality) will also increase. Wireless communications devices capable of accessing the Internet (sometimes referred to as Internet Over The Air or "IOTA") are particularly likely to require such software downloads. Wireless software downloads would be preferable in such cases to avoid the necessity of providing a separate Internet connection mechanism simply for software downloads.

Wireless performance of software downloads to wireless Internet-access devices is currently the subject of considerable effort, but standardization of such wireless downloads is challenging due to the wide disparity in technology employed by wireless devices. Wireless software downloads may be achieved by a variety of means including file transfer protocol (FTP), trivial file transfer protocol (TFTP), etc. However, all of these methods require running the entire network protocol stack—including the radio frequency (RF), call processing, and transmission control protocol/Internet protocol (TCP/IP) layers—on the wireless communications device in order to download new software.

Moreover, the wireless device must include sufficient nonvolatile storage to store the newly downloaded software, which in many cases will be a replacement for existing software and will therefore generally require at least twice the amount of storage as the current software. These requirements are significant since most wireless devices are carefully designed to optimize storage for performance/cost trade-offs, and adding additional or spare storage specifically for download purposes will directly add to the unit cost in an unacceptable manner.

There is, therefore, a need in the art for an effective method of performing wireless software downloads to wireless communications devices, particularly resource constrained wireless communications devices capable of wireless connection to the Internet.

SUMMARY OF THE INVENTION

To address the above-discussed deficiencies of the prior art, it is a primary object of the present invention to provide, for use in a communications system, a technique for performing wireless software downloads for resource-constrained wireless devices capable of Internet access by connecting the wireless device to an auxiliary device and downloading the software through the wireless device to storage within the auxiliary device. Once downloaded, the software is installed on the wireless device from the auxiliary device. Use of the wireless device as a download conduit allows security and other features integrated into the wireless device to be directly employed during the download and installation.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

Figure 1:
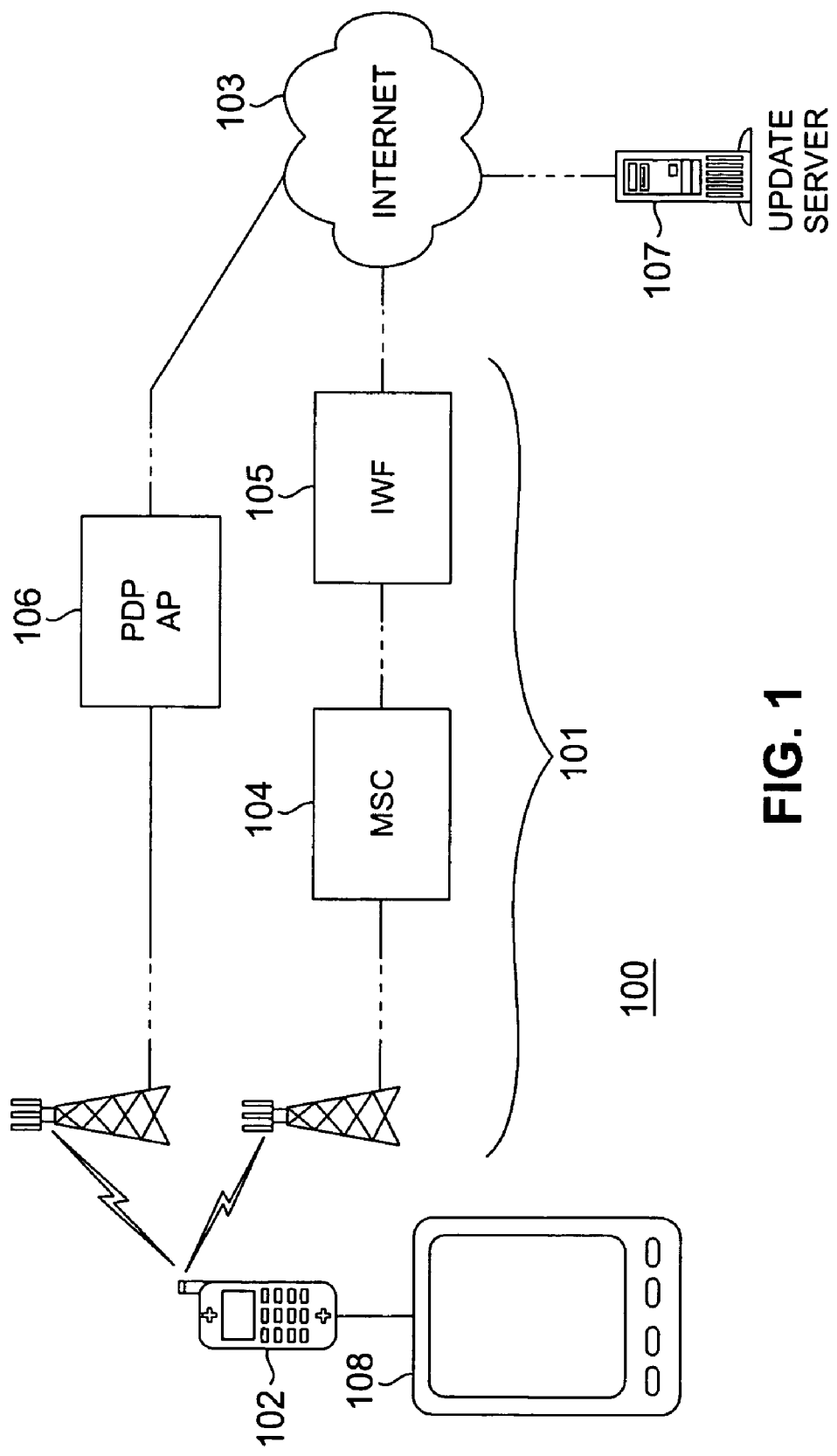
FIG. 1 depicts a communications system employed for wireless software downloads to a resource-constrained wireless device capable of Internet access according to one embodiment of the present invention.
Figure 2:
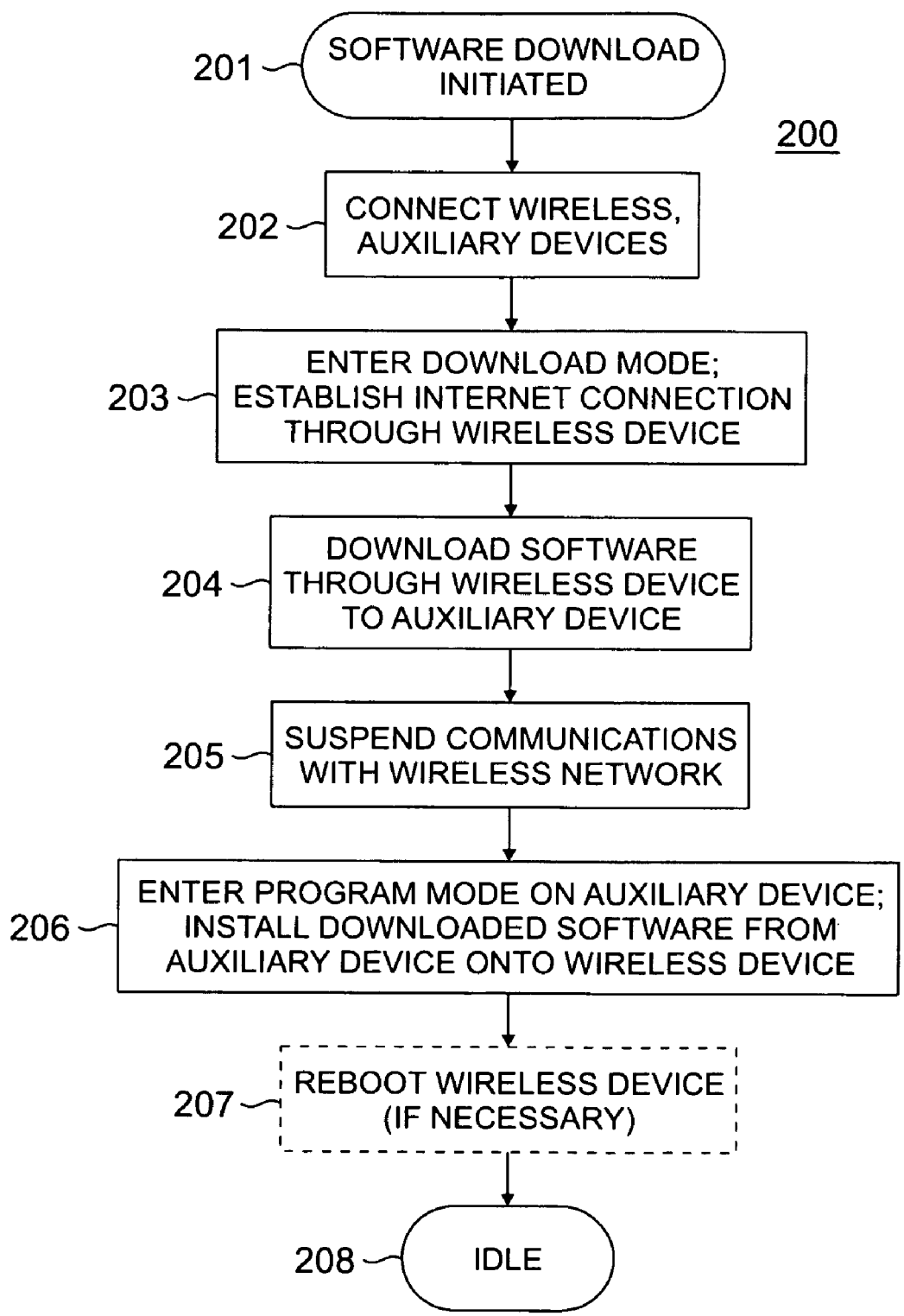
FIG. 2 is a high level flowchart for a process of performing a wireless software download for a resource-constrained wireless device capable of Internet access according to one embodiment of the present invention.

FIGS. 1 and 2, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device.

FIG. 1 depicts a communications system employed for wireless software downloads to a resource-constrained wireless device capable of Internet access according to one embodiment of the present invention. Communications system 100 includes a wireless communications network 101 coupling a wireless communications device 102 to the Internet 103. Wireless communications device 102 is depicted as a telephone, but may be any wireless communications device including, but not limited to, paging devices, personal digital assistants, or text-message transmission devices. In particular, wireless communications device 102 may be a resource-constrained device of the type described above, lacking spare storage for holding downloaded software.

Wireless connectivity between the wireless communications device 102 and the Internet 103 is provided by wireless communications network 101 through, for example, a mobile switching center (MSC) 104 and inter-working function (IWF) 105, or through a packet data protocol (PDP) access point (AP) 106 for a general packet radio service (GPRS) gateway GPRS support node (GGSN).

Those skilled in the art will recognize that the complete structure and operation of a wireless communications network and other components within communications system 100 are not depicted or described. The present invention may be employed in conjunction with known wireless communications networks and other components, and only so much of those components as is unique to the present invention or necessary for an understanding of the present invention are depicted and described.

In performing wireless software downloads, wireless communications device 102 employs the wireless connection to the Internet 103 provide by wireless communications network 101 to access a software update server 107, which contains software to be downloaded to and installed within wireless communications device 102 for either replacing or augmenting existing software within wireless communications device 102. In order to download software from server 107, wireless communications device 102 is connected to an auxiliary device 108. The connection between the wireless communications device 102 and auxiliary device 108 may be a wired connection employing a universal asynchronous receiver-transmitter (UART) or a universal serial bus (USB) or a wireless connection conformation to Infrared Data Association (IrDA) or Bluetooth standards. The auxiliary device 108 is, for example, a personal computer or personal digital assistant (PDA). In many instances, connectivity between a mobile telephone (wireless communications device 102) and a personal digital assistant (auxiliary device 108) will already be available for purposes such as synchronizing (electronic mail) message databases or personal information (contact) manager databases on the two devices.

Auxiliary device 108 contains custom software allowing the auxiliary device 108 to manage the entire procedure for downloading and installing software described below. When software needs to be downloaded to the wireless communications device 102, the auxiliary device 108 is connected to the wireless communications device 102 and one or both devices are placed in a download mode in which auxiliary device 108 utilizes the wireless communications device 102 as a conduit to reach the Internet 103.

Independent of whether auxiliary device 108 has another connection to the Internet 103, the process of the present invention utilizes a TCP/IP connection between the auxiliary device 108 and the Internet 103 via the wireless communications device 102 to perform the software downloaded. The required software update for wireless communications device 102 is then downloaded via the connection and buffered within nonvolatile storage for the auxiliary device 108. The retrieved software in downloaded (uninstalled) form is therefore NOT stored within the wireless communications device 102, but is instead initially stored within the auxiliary device 108.

The wireless communications device 102 merely serves as a conduit during the software download and is not utilized to store the downloaded software prior to installation. However, the connection used to download the software includes wireless communications device 102, which allows, for instance, software registration, security and encryption keys associated with the wireless communications device 102 to be employed in downloading the software without transfer of such keys to any intermediate devices.

Once the software is downloaded in its entirety, one or both of the wireless communications device 102 and the auxiliary device 108 enters a program mode, in which the wireless communication device 102 no longer communicates with wireless network 101 (i.e., wireless communications device 102 is "off the air"). The auxiliary device 108 then proceeds to program the wireless communications device 102 with the buffered software update, installing the downloaded software in wireless communications device 102. Once programming/installation is complete, the auxiliary device 108 restarts or "reboots" the wireless communications device 102 so that the newly loaded software is used by the wireless communications device 102.

After installing the downloaded software on wireless communications device 102, auxiliary device 108 may discard the downloaded software. Alternatively, the downloaded software may be retained by auxiliary device 108 for potential reinstallation on wireless communications device 102 or installation on other wireless devices of the same type. The downloaded software may therefore be reused for multiple identical wireless devices without consuming (or reducing consumption of) wireless bandwidth for each device, an attractive option for corporate users, small regional service centers, and the like.

If the auxiliary device 108 does include an Internet connection independent of the conduit provided by connection to wireless communications device 102, such as a local area network (LAN) plain old telephone system (POTS), or digital subscriber line (DSL) connection, the software may optionally downloaded to auxiliary device 108 from server 107 without employing wireless communications device 102. This option is less desirable since an second Internet connection, independent of that provided by wireless communications device 102, is required within the auxiliary device 108, and since security features built into the wireless communications device 102 cannot be directly employed. However, in the event that the software within wireless communications device 102 somehow becomes unusable, this alternative may be employed to restore wireless communications device to operability.

FIG. 2 is a high level flowchart for a process of performing a wireless software download for a resource-constrained wireless device capable of Internet access according to one embodiment of the present invention. The process 200 begins with a wireless software download to a resource-constrained wireless device capable of Internet access being initiated by the user (step 201). The wireless device is first connected to a suitable auxiliary device (step 202), which may require prompting the user to manually connect the devices where wired connectivity between the wireless and auxiliary devices is employed.

Once the wireless and auxiliary devices are connected, one or both of the devices enters a download mode and an Internet connection to the auxiliary device is established through the wireless device (step 203). Software is then downloaded from a designated server through the wireless device to (preferably nonvolatile) storage within the auxiliary device (step 204). After the software download completes, wireless communications involving the wireless device are suspended (step 205), one or both device enters a program mode, and the wireless device is programmed with the downloaded software (step 206). The wireless device is then rebooted to initiate use of the newly installed software (step 207) and the process becomes idle (step 208) until the user again initiates wireless software download to the wireless device.

The present invention avoids including excessive non-volatile memory within wireless communications devices solely for supporting software updates, and thus directly reduces the unit cost of the wireless communications devices. The present invention is therefore a cost-effective solution to the problems involved in wireless software downloads and, due to its inherent simplicity, allows ordinary users to perform software updates for their phones to reduce support costs. When used by service centers and the like, the software upgrade process is streamlined.

It is important to note that while the present invention has been described in the context of a fully functional communications device or system, those skilled in the art will appreciate that the mechanism of the present invention is capable of being implemented and distributed in the form of a computer usable medium of instructions in a variety of forms, and that the present invention applies equally regardless of the particular type of signal bearing medium is used to carry out the distribution. Examples of suitable computer usable mediums include: nonvolatile, hard-coded or programmable type mediums such as read only memories (ROMs) or erasable, electrically programmable read only memories (EEPROMs), recordable type mediums such as floppy disks, hard disk drives, and read/write (R/W) compact disc read only memories (CD-ROMs) or digital versatile discs (DVDs), and transmission type mediums such as digital and analog communications links.

Although the present invention has been described in detail, those skilled in the art will understand that various changes, substitutions, variations, enhancements, nuances, gradations, lesser forms, alterations, revisions, improvements and knock-offs of the invention disclosed herein may be made without departing from the spirit and scope of the invention in its broadest form.

What is claimed is:

1. For use in a communications system, an apparatus for wireless software download to a wireless communications device capable of Internet access comprising:
   an auxiliary device separate from the wireless communications device including sufficient storage for holding program code to be downloaded; and
   a connection between the wireless communications device and the auxiliary device,
   wherein the auxiliary device retrieves the program code to be downloaded from a remote server through a wireless connection for the wireless communications device into the auxiliary device and installs the downloaded program code from the auxiliary device onto the wireless communications device.

2. The apparatus according to claim 1, wherein the auxiliary device lacks a connection to the remote server independent of the connection between the wireless communications device and the auxiliary device.

3. The apparatus according to claim 1, wherein the wireless communications device lacks sufficient storage to hold the program code to be downloaded in addition to existing software within the wireless communications device.

4. The apparatus according to claim 1, wherein the auxiliary device retrieves the program code to be downloaded from the remote server through an Internet connection provided by the wireless communications device.

5. The apparatus according to claim 1, wherein the wireless communications device is a mobile telephone and the auxiliary device is a personal digital assistant.

6. The apparatus according to claim 1, wherein the program code downloaded to the auxiliary device, when installed on the wireless communications device, replaces software on the wireless device at a time of the program code download.

7. The apparatus according to claim 1, wherein the auxiliary device retains the program code after installation on the wireless communications device and reuses the program code for installation on other similar wireless communications devices.

8. A communications system, comprising:
   a wireless communications device capable of Internet access via a wireless connection to a wireless network;
   an auxiliary device separate from the wireless communications device including sufficient storage for holding program code to be downloaded; and
   a connection between the wireless communications device and the auxiliary device,
   wherein the auxiliary device retrieves the program code to be downloaded from a remote server through the wireless connection for the wireless communications device into the auxiliary device and installs the downloaded program code from the auxiliary device onto the wireless communications device.

9. The communications system according to claim 8, wherein the auxiliary device lacks a connection to the remote server independent of the connection between the wireless communications device and the auxiliary device.

10. The communications system according to claim 8, wherein the wireless communications device lacks sufficient storage to hold the program code to be downloaded in addition to existing software within the wireless communications device.

11. The communications system according to claim 8, wherein the auxiliary device retrieves the program code to be downloaded from the remote server through an Internet connection provided by the wireless communications device.

12. The communications system according to claim 8, wherein the wireless communications device is a mobile telephone and the auxiliary device is a personal digital assistant.

13. The communications system according to claim 8, wherein the program code downloaded to the auxiliary device, when installed on the wireless communications device, replaces software on the wireless device at a time of the program code download.

14. The communications system according to claim 8, wherein the auxiliary device retains the program code after installation on the wireless communications device and reuses the program code for installation on other similar wireless communications devices.

15. For use in a communications system, a method of performing wireless software downloads to a wireless communications device capable of Internet access comprising:

connecting the wireless communications device to an auxiliary device separate from the wireless communications device including sufficient storage for holding program code to be downloaded; and the auxiliary device retrieving the program code to be downloaded from a remote server through a wireless connection for the wireless communications device into the auxiliary device; and the auxiliary device installing the downloaded program code from the auxiliary device onto the wireless communications device.

16. The method according to claim 15, wherein the auxiliary device lacks a connection to the remote server independent of the connection between the wireless communications device and the auxiliary device.

17. The method according to claim 15, wherein the wireless communications device lacks sufficient storage to hold the program code to be downloaded in addition to existing software within the wireless communications device.

18. The method according to claim 15, wherein the step of the auxiliary device retrieving the program code to be downloaded from a remote server through a wireless connection for the wireless communications device into the auxiliary device further comprises:

the auxiliary device retrieving the program code to be downloaded from the remote server through an Internet connection provided by the wireless communications device.

19. The method according to claim 15, wherein the wireless communications device is a mobile telephone and the auxiliary device is a personal digital assistant.

20. The method according to claim 15, wherein the step of the auxiliary device installing the downloaded program code from the auxiliary device onto the wireless communications device further comprises:

the auxiliary device replacing software on the wireless device at a time of the software download with the downloaded program code.

* * * * *